US 6,547,141 B1

(12) United States Patent
Lepore et al.

(10) Patent No.: US 6,547,141 B1
(45) Date of Patent: Apr. 15, 2003

(54) INVENTORY LOCATING DEVICE

(76) Inventors: Vernon D. Lepore, 5707 Catoctin Overlook Dr., Mount Airy, MD (US) 21771; Gerald R. Baker, 1730 Florence Rd., Mount Airy, MD (US) 21771

( * ) Notice: Subject to any disclaimer, the term of this patent is extended or adjusted under 35 U.S.C. 154(b) by 0 days.

(21) Appl. No.: 09/975,065

(22) Filed: Oct. 10, 2001

(51) Int. Cl.[7] .................................................. G06K 7/10
(52) U.S. Cl. .................................. 235/462.01; 235/385
(58) Field of Search .................... 235/462.01, 462.35, 235/385

(56) References Cited

U.S. PATENT DOCUMENTS

| | | |
|---|---|---|
| 4,384,500 A | 5/1983 | Friberg |
| 4,970,802 A | 11/1990 | Nosek |
| 5,493,107 A | 2/1996 | Gupta et al. |
| 6,056,199 A | 2/2000 | Wiklof et al. |
| 6,189,789 B1 | 2/2001 | Levine et al. |
| 6,199,292 B1 | 3/2001 | Ebeling |
| 6,457,642 B1 * | 10/2002 | Good et al. ............ 235/462.01 |

* cited by examiner

*Primary Examiner*—Harold I. Pitts
(74) *Attorney, Agent, or Firm*—Stephen R. Greiner

(57) ABSTRACT

An inventory locating device including an optical scanner for reading bar code labels containing product identifying information. A pair of measuring wheels, one positioned on each side of the scanner, is provided for running along a supporting surface as the optical scanner reads bar code labels on the surface. By means of an endless belt, rotational motion of the measuring wheels is transmitted to a shaft encoder permitting the distance traveled by the device to a given label to be calculated and tracked. Information gathered by the optical scanner and shaft encoder is relayed by a radio frequency transmitter to a remote receiver for storage and processing.

7 Claims, 1 Drawing Sheet

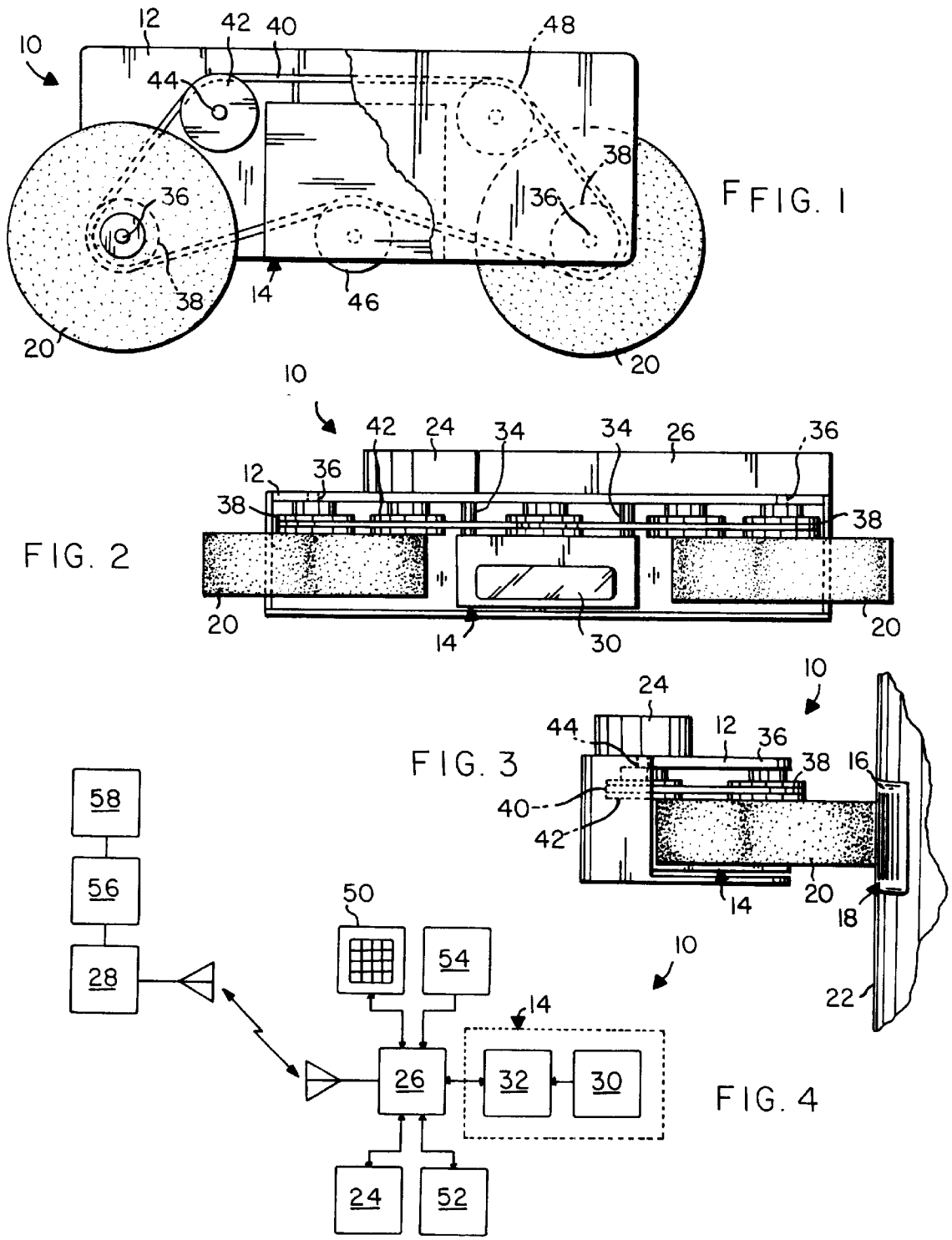

INVENTORY LOCATING DEVICE

FIELD OF THE INVENTION

The present invention relates generally to registers and, more particularly, to optical scanners for reading bar codes.

BACKGROUND OF THE INVENTION

Conducting inventories of thousands of items contained in large warehouse-type stores has always been a labor-intensive and costly task. The process typically involves: closing a store to prevent the movement of items to be inventoried, sending a group of employees out to locate and count the items and, finally, tabulated the results of the inventory in a fixed record. With accurate inventory data, store managers can create a virtual map of their stores, locating all items there.

As with many processes involving people, errors are frequently made in conducting inventories. Items, for example, are sometimes entirely overlooked when moved from their usual storage places for special events and sales. Of course, it is not entirely unheard of for "typos" to creep into inventory records. Thus, it has always been difficult to obtain accurate inventories of large stores more than once every few weeks, sometimes making it difficult to locate and map items being offered to the public for sale.

To avoid some of the problems inherent in conducting inventories, many retailers have taken to using hand-held, bar-code scanners to obtain identification data from labels positioned on items or positioned adjacent thereto. The data is obtained from the label with the push of a button and ultimately downloaded to a remote computer for processing. The known scanners lack features for determining where in the store the scanned item is encountered thereby making the generation of a virtual map of the contents of a store difficult to make.

SUMMARY OF INVENTION

In light of the problems associated with the known bar code scanners used for conducting storewide, item inventories, it is the principal object of the invention to provide an inventory locating device that will collect information from bar code labels and measure the distance of the labels away from a fixed reference point. Such a device permits the generation of a database describing the exact location of thousands of items in a retail, warehouse, or record archive environment.

It is a further object of the invention to provide an inventory locating device of the type described that is portable and easily carried by a user. The device is also easy to use, requiring minimal training and no special tools.

It is an object of the invention to provide improved elements and arrangements thereof in an inventory locating device for the purposes described which is lightweight in construction, inexpensive to manufacture, and dependable in use.

Briefly, the inventory locating device in accordance with this invention achieves the intended objects by featuring an optical scanner for reading optically encoded information from an object. A decoder is coupled to the optical scanner for receiving and processing optically encoded information to generate a set of optical scanner transmission data. At least one measuring wheel of known circumference is positioned adjacent the optical scanner. The measuring wheel is capable of maintaining the optical scanner at a predetermined distance from the object as optically encoded information is being read. A shaft encoder is connected to the axle of the measuring wheel and generates a set of dimensional transmission data in response to rotational movement of the axle as the wheel is rolled along the object. A transmitter is coupled to the decoder and shaft encoder for receiving the set of optical scanner transmission data and the set of dimensional transmission data and for broadcasting the set of optical scanner transmission data and the set of dimensional transmission data via radio waves.

The foregoing and other objects, features and advantages of the present invention will become readily apparent upon further review of the following detailed description of the preferred embodiment as illustrated in the accompanying drawings.

BRIEF DESCRIPTION OF THE DRAWINGS

The present invention may be more readily described with reference to the accompanying drawings, in which:

FIG. 1 is a top view of an inventory locating device in accordance with the present invention with portions broken away to reveal details thereof.

FIG. 2 is a front view of the inventory locating device of FIG. 1.

FIG. 3 is a left side view of the inventory locating device.

FIG. 4 is a schematic diagram of the inventory locating device and remote receiver apparatus.

Similar reference characters denote corresponding features consistently throughout the accompanying drawings.

DETAILED DESCRIPTION OF THE PREFERRED EMBODIMENT

Referring now to the FIGS., an inventory locating device in accordance with the present invention is shown at 10. Device 10 includes a base plate 12 carrying a bar code reader 14 for interpreting labels 16 provided with bar codes 18. A pair of measuring wheels 20 is secured to the front of plate 12 for maintaining reader 14 at a fixed distance from labels 16 having been affixed to a supporting surface 22. Rotational motion of measuring wheels 20 is transmitted to a shaft encoder 24 permitting the distance traveled by device 10 along surface 22, which may be curved as shown in FIG. 3 or flat, to any of labels 16 to be measured. Information gathered by reader 14 and shaft encoder 24 is relayed by a radio frequency transmitter 26 atop plate 12 to a remote receiver 28 for storage and processing.

Bar code reader 14 includes an optical scanner 30 and decoder 32 secured by posts 34 to base plate 12. Preferably, scanner 30 is mounted to the bottom of plate 30 so that light emitted thereby is directed away from the front of plate 30 and toward supporting surface 22 between measuring wheels 20. Decoder 32, however, is integrally formed with scanner 30 and is operatively connected thereto by means of electrical leads (not shown).

The bar code 18 on label 16 is a series of varying width, vertical bars and spaces representative of a number. Light from scanner 30 is directed onto bar code 18 with the light being absorbed by the bars and reflected by the intervening spaces. A photocell in scanner 30 receives the reflected light and converts such into electrical signals. In response, the photocell generates a low electrical signal for the spaces and a high electrical signal for the bars with the duration of the electrical signal reflecting the varying widths of the spaces and bars. These signals are "decoded" by decoder 32 into a number that is, then, delivered to transmitter 26 in a binary format.

Measuring wheels 20 are formed of foam rubber for a good grip upon surface 22. Preferably, wheel-supporting axles 36 are journaled in the front of plate 12. Axles 36 carry wheels 20 at their bottom ends beneath plate 12 and support drive pulleys 38 immediately above wheels 20. The rotation of wheels 20 as they travel over surface 22 causes a corresponding rotation of both axles 36 and pulleys 38.

Drive pulleys 38 are coupled through an endless belt 40 to digital shaft encoder 24. Belt 40 extends around each of the drive pulleys 38 and a driven pulley 42 on the input shaft 44 of encoder 24. A pair of idler pulleys 46 and 48, secured atop plate 12, maintains a suitable tension in belt 40.

Shaft encoder 24 is preferably of quadrature-type and is readily available from a variety of sources. Such encoders are known for their durability, accuracy, and ability to measure distances regardless of the direction of rotation of their input shafts. (Thus, such encoders permit wheels 20 to be rolled backward if a label 16 is inadvertently not scanned of if the user changes his direction of scanning.) In use, rotation of driven pulley 42 and shaft 44 causes encoder 24 to emit signals in binary format to transmitter 26 representative of distance traveled by wheels 20 from a set starting point.

Use of device 10 is straightforward. First, a user positions wheels 20 against surface 22 bearing labels 16 which may be the front edge of a shelf or bin in a store or warehouse. Then, at a steady pace, the user pushes device 10 along surface 22 permitting bar code reader 14 to interpret bar codes 18 on labels 16. The distance traveled by device 10 to a particular label 16 is simultaneously determined by shaft encoder 24 coupled, through belt 40 to wheels 20. (As long as at least one of wheels 20 is in contact with surface 22, shaft encoder 24 will provide accurate output.) Automatically, information obtained by bar code reader 14 and shaft encoder 24 is relayed to transmitter 26 and broadcast to remote receiver 28.

A keypad 50 may, optionally, be coupled by means of conventional cables and connectors (not shown) to transmitter 26. Keypad 50 permits a user to reset the distance measured by encoder 24 to zero and to input data regarding, among other things, the quantity or condition of an item found adjacent a label 16. Such data would be broadcast via transmitter 26 in binary format to remote receiver 28 for further use. Similarly, an alarm 52, in the form of an LED display or sound generator, could be attached to device 10 to indicate that a label 16 was improperly scanned.

Electrical power for optical scanner 30, decoder 32, shaft encoder 24, transmitter 26 and any peripheral devices used with device 10 will be supplied by a rechargeable, external battery pack 54 that may be carried on the belt of a user. Of course, battery pack 54 may be carried upon plate 12 but such a positioning would add to the weight of device 10 and may induce unnecessary fatigue in a user.

A central processing unit (CPU) 56 is connected to receiver 28 and uses received data to tabulate information obtained from device 10. Ultimately, the information could be used to generate a three-dimensional map of the inventoried space showing the location and count of each item within the space. This map, showing aisles, shelves and like landmarks, would be output from CPU 56 to a computer monitor 58 for display. Preferably, monitor 58 is incorporated into a kiosk accessible to customers in a store attempting to find items located there.

The kiosk, then, emulates a salesperson by answering the most frequently asked questions by a customer in a retail store. By providing a readily available map of product locations, salespeople are freed to sell rather than serve merely as store guides. Because fewer people are now required to handle sales in a store, overhead costs are reduced. Customers and store owners ultimately benefit.

While the invention has been described with a high degree of particularity, it will be appreciated by those skilled in the art that modifications may be made thereto. For example, it would be possible to eliminate transmitter 26 and receiver 28 and connect device 10 directly to CPU 56 with suitable cabling although some convenience in using device 10 would be lost. Additionally, device 10 could be mounted upon a cart to assist in data collection from a series of labels mounted at equal height on a long shelf or wall. Therefore, it is to be understood that the present invention is not limited to the sole embodiment described above, but encompasses any and all embodiments within the scope of the following claims.

We claim:

1. An inventory locating device, comprising:

an optical scanner for reading optically encoded information from an object;

a decoder, coupled to said optical scanner for receiving and processing the optically encoded information to generate a set of optical scanner transmission data;

at least one measuring wheel of known circumference having an axle positioned adjacent said optical scanner, said wheel being capable of maintaining said optical scanner at a predetermined distance from said object as optically encoded information is being read;

a shaft encoder connected to said axle for generating a set of dimensional transmission data in response to rotational movement of said axle as said wheel is rolled along said object; and, a transmitter coupled to said decoder for receiving said set of optical scanner transmission data and coupled to said shaft encoder for receiving said set of dimensional transmission data and for broadcasting said set of optical scanner transmission data and said set of dimensional transmission data via radio waves.

2. The inventory locating device according to claim 1 further comprising a keypad coupled to said transmitter for generating a set of ancillary transmission data for broadcasting via radio waves.

3. The inventory locating device according to claim 1 further comprising a rechargeable battery pack for supplying electrical power to: said optical scanner, said decoder, said shaft encoder and said transmitter.

4. An inventory locating device, comprising:

an optical scanner for reading optically encoded information from an object;

a decoder coupled to said optical scanner for receiving and processing the optically encoded information to generate a set of optical scanner transmission data;

a pair of measuring wheels of known circumference having axles positioned on opposite sides of said optical scanner, said measuring wheels being capable of maintaining said optical scanner at a predetermined distance from said object as optically encoded information is being read;

a shaft encoder connected to said axles for generating a set of dimensional transmission data in response to rotational movement of said axles as said measuring wheels are rolled along said object; and, a transmitter coupled to said decoder for receiving said set of optical scanner transmission data and coupled to said shaft encoder for receiving said set of dimensional transmission data and for broadcasting said set of optical scanner transmission data and said set of dimensional transmission data via radio waves.

5. The inventory locating device according to claim 4 further comprising a keypad coupled to said transmitter for generating a set of ancillary transmission data for broadcasting via radio waves.

6. The inventory locating device according to claim 4 further comprising a rechargeable battery pack for supplying electrical power to: said optical scanner, said decoder, said shaft encoder and said transmitter.

7. An inventory locating device, comprising:

an optical scanner for reading optically encoded information from an object;

a decoder coupled to said optical scanner for receiving and processing the optically encoded information to generate a set of optical scanner transmission data;

a pair of measuring wheels of known circumference having axles positioned on opposite sides of said optical scanner, said measuring wheels being capable of maintaining said optical scanner at a predetermined distance from said object as optically encoded information is being read;

a shaft encoder connected to said axles for generating a set of dimensional transmission data in response to rotational movement of said axles as said measuring wheels are rolled along said object;

an endless belt coupling said measuring wheels to said shaft encoder; and, a transmitter coupled to said decoder for receiving said set of optical scanner transmission data and coupled to said shaft encoder for receiving said set of dimensional transmission data and for broadcasting said set of optical scanner transmission data and said set of dimensional transmission data via radio waves.

* * * * *